United States Patent [19]
Hirano

[11] Patent Number: 6,052,178
[45] Date of Patent: Apr. 18, 2000

[54] METHOD FOR ALIGNING OPTICAL ELEMENTS ONE ANOTHER ON V-GROOVE SUBSTRATE

[75] Inventor: Yoshimasa Hirano, Minato-ku, Japan

[73] Assignee: Oki Electric Industry Co., Ltd., Tokyo, Japan

[21] Appl. No.: 09/015,929

[22] Filed: Jan. 30, 1998

[30] Foreign Application Priority Data

Feb. 5, 1997 [JP] Japan .................................. 9-021879

[51] Int. Cl.[7] .................................................. G01N 21/00
[52] U.S. Cl. .............................................. 356/73.1; 385/49
[58] Field of Search ........................... 356/73.1; 385/49, 385/89, 39, 88, 14; 430/321, 317

[56] References Cited

U.S. PATENT DOCUMENTS 4,466,696  8/1984  Carney ..................................... 430/321
5,641,612  6/1997  Lee et al. ................................. 430/321
5,721,797  2/1998  Basavanhally et al. ................... 385/49

FOREIGN PATENT DOCUMENTS 0704 731 AW  4/1996  European Pat. Off. .

Primary Examiner—Frank G. Font
Assistant Examiner—Tu T. Nguyen
Attorney, Agent, or Firm—Jones Volentine, L.L.P.

[57] ABSTRACT

Aligning a plurality of optical elements on a substrate includes producing a plurality of recesses in the substrate so as to define a desired alignment and/or orientation between the optical elements when the optical elements are mounted to the substrate, producing a mounting for one of the optical elements on the substrate, and using one of the recesses as an alignment reference during the producing the mounting, so as to maintain the desired alignment and/or orientation The optical element may be a light emitter or a light detector.

7 Claims, 7 Drawing Sheets

METHOD FOR ALIGNING OPTICAL ELEMENTS ONE ANOTHER ON V-GROOVE SUBSTRATE

FIELD OF THE INVENTION

This invention relates to a method for aligning optical elements, such as an optical fiber, a Laser diode, a Photo diode et al. one another on a V-groove substrate defined as a module on which optical elements are arranged for connecting the optical parts thereof one another, with a high grade of accuracy.

BACKGROUND OF THE INVENTION

The optical elements such as an optical fiber, a Laser diode and a Photo diode et al. are required to be connected to one another with a high grade of accuracy. Otherwise, the light transmission efficiency is deteriorated. For the purpose, various types of optical connectors were developed. Since most of them use a lense or the like to adjust the optical parts thereof, however, they were not necessarily convenient to employ, in addition to that the degree of accuracy achievable by the optical connectors is not necessarily satisfactory. Developed to remove the drawbacks is a module on which plural optical elements such as an optical fiber, a Laser diode, a Photo diode et al. can be arranged in one action with a high grade of accuracy to secure a continuous optical path for the plural optical elements to allow them to transmit light signals.

Production of the module is based on the technology prevailing for production of semiconductor devices e.g. photo lithography processes, processes for etching a specific semiconductor substrate or layer, processes for depositing a specific metal layer on a semiconductor layer et al. Thus, such a module is usually called a V-groove substrate. In this specification, this nomenclature is employed.

Referring to FIG. 1, a brief description to a V-groove substrate available in the prior art will be presented below. A V-groove (7) is produced along the top surface of an Si substrate (1) covered by an $SiO_2$ layer (8). An optical fiber (14) is arranged in the V-groove (7) whose surface is covered by an $SiO_2$ layer (8) as well. The core (15) of the optical fiber (14) extends in a horizontal direction towards a Laser diode or Photo diode (13) arranged opposite to the core (15) of the optical fiber (14). The anode wiring (16) and the cathode wiring (17) of the Laser diode or Photo diode (13) are arranged on the top surface of the Si substrate (1). In this example, a monitor photo diode (18) is arranged opposite to the Laser diode or Photo diode (13). The anode wiring (19) and the cathode wiring (20) of the monitor photo diode (18) are arranged on the top surface of the Si substrate (1) as well.

In the V-groove substrate available in the prior art, it is still important to align a Laser diode or a Photo diode with an optical fiber with a dimensional accuracy of ±1 μm. Otherwise, the optical axis of a Laser diode or of a Photo diode can not be aligned with the core of an optical fiber.

Since an anisotropic etching process conducted employing a KOH solution is inevitably accompanied by side etching in which the ratio of the side etching versus the vertical etching is as large as approximately 0.3, it is not easy to align an optical element with a finished V-groove, resultantly causing a dissatisfactory grade of alignment accuracy for the optical elements and an optical fiber.

Further, it is recognized that the longitudinal edges (an edge along or parallel to the axis of a V-groove) of a V-groove produced employing a KOH solution is inclined to go zigzag or meander. This is one of the reasons to make the alignment an optical element with an optical fiber difficult. Thus, it is very convenient, if such a meander or the linearity of the edges of a V-groove can be found during the process for producing the V-groove.

OBJECTS AND SUMMARY OF THE INVENTION

Accordingly, an object of this invention is to provide a method for aligning optical elements such as an optical fiber, a Laser diode, a Photo diode et al. one another on a V-groove substrate.

The other object of this invention is to provide a method for inspecting the linearity of the edges of a V-groove during the process for producing the V-groove.

To achieve the foregoing objects, a method for aligning optical elements is based on an idea to use the stepped edges of a recess produced on an Si substrate and which recess is covered by a transparent material such as $SiO_2$, a photo resist or the like as a reference for aligning an object arranged thereon.

More specifically, a method for aligning optical elements in accordance with this invention includes a step for producing plural recesses at areas on which plural optical elements are scheduled to be arranged, on an Si substrate having a plane top surface, a step for producing an etching mask employable for producing a V-groove in which an optical fiber is scheduled to be arranged, by employing the stepped edges of the recess produced at the area on which the V-groove is scheduled to be produced, a step for producing the V-groove in which an optical fiber is scheduled to be arranged, by employing an etching process conducted by employing an etching process conducted by employing a KOH solution and employing the etching mask produced in the earlier step, a step for removing the etching mask employed in the earlier step, a step for oxidizing the entire surface of the Si substrate, a step for producing a metal pad on which a Laser diode or a Photo diode is arranged on the $SiO_2$ layer produced on the Si substrate in the earlier step, by employing the stepped edges of the recess produced at the area on which the Laser diode or the Photo diode is arranged as an alignment mark, and a step for arranging the Laser diode or the Photo diode is arranged on the metal pad produced in the earlier step, by employing the stepped edges of the recess produced at the area on which the Laser diode or the Photo diode is arranged as an alignment mark.

A method for inspecting the linearity of the edges of a V-groove during the process for producing the V-groove in accordance with this invention includes a step for keeping observing the longitudinal edges of a V-groove produced employing a KOH solution in comparison with the stepped edges of the recess produced at the area on which the V-groove is scheduled to be produced, during the process for producing the V-groove.

BRIEF DESCRIPTION OF THE DRAWINGS

This invention, together with its various features and advantages, can be readily understood from the following more detailed description presented in conjunction with the following drawings, in which.

DETAILED DESCRIPTION OF THE PREFERRED EMBODIMENT OF THIS INVENTION

Referring to drawings, a method for aligning optical elements in accordance with one embodiment of this invention and a method for inspecting the linearity of the edges of a V-groove during the process for producing the V-groove in accordance with one embodiment of this invention will be described below.

First Embodiment

A method for aligning optical elements.

Figure 1:
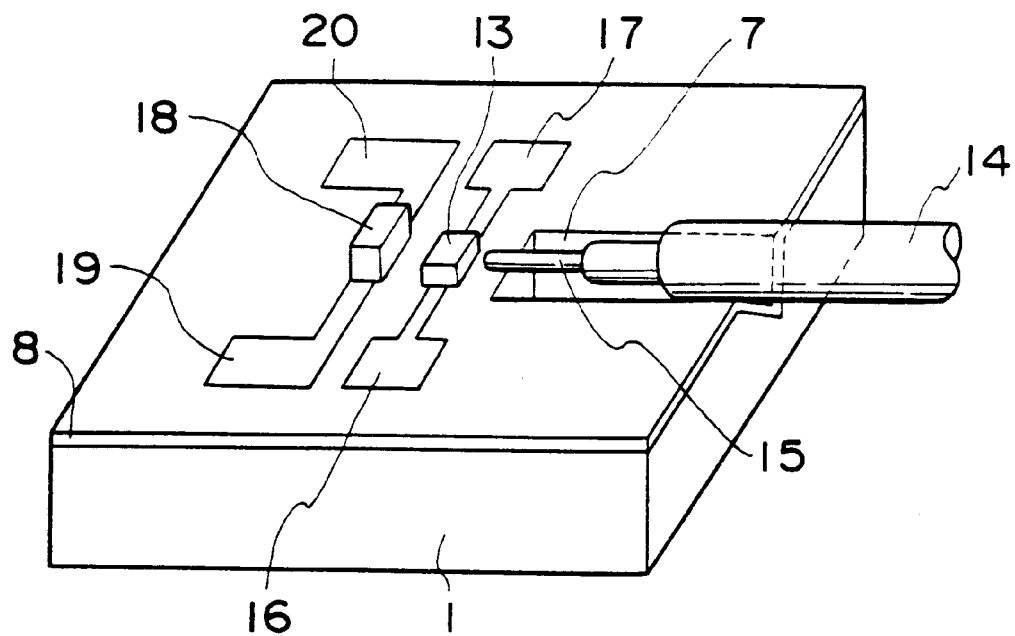
FIG. 1 is a perspective view of a V-groove substrate, defined as a module on which plural optical elements such as an optical fiber, a Laser diode, a Photo diode et al, can be arranged in one action with a high grade of accuracy to secure a continuous optical path for the plural optical elements to allow them to transmit light signals, available in the prior art.
Figure 2:
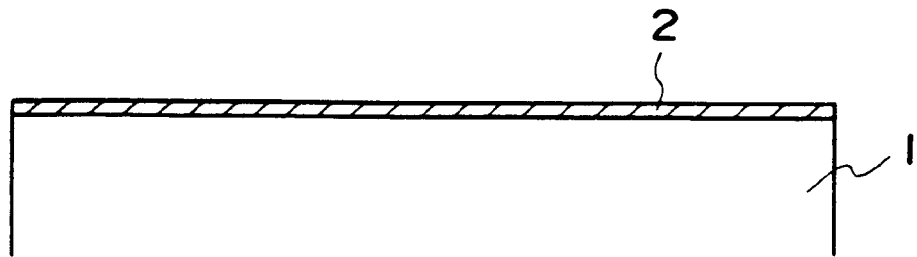
FIG. 2 is a cross section of an Si substrate under progress of a method for aligning optical elements in accordance with the first embodiment of this invention.

Referring to FIG. 2, an oxidation process is applied to an Si substrate (1) having a crystalline orientation of <100> to produce an $SiO_2$ layer (2) having an approximate thickness of 1500 Å thereon.

Figure 3:
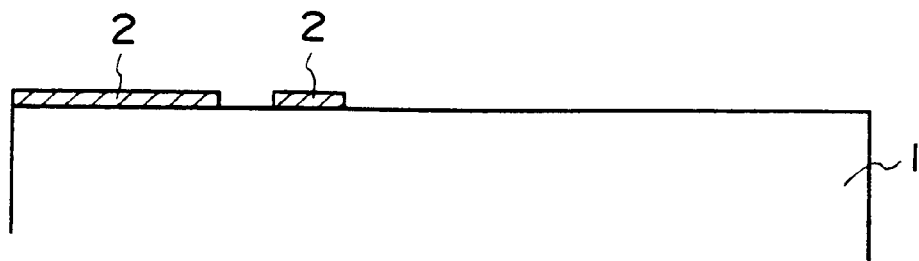
FIG. 3 is a cross section of an Si substrate under progress of a method for aligning optical elements in accordance with the first embodiment of this invention.

Referring to FIG. 3, a photo lithography process is conducted to remove the $SiO_2$ layer (2) from the area on which a V-groove for an optical fiber is produced and a metal pad for an optical element are scheduled to be arranged.

Figure 4:
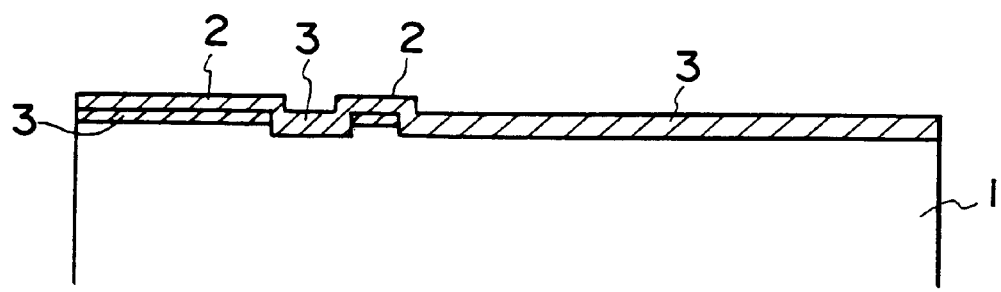
FIG. 4 is a cross section of an Si substrate under progress of a method for aligning optical elements in accordance with the first embodiment of this invention.

Referring FIG. 4, an oxidation process is conducted again to produce an $SiO_2$ layer (3) having an approximate thickness of 1500 Å on the $SiO_2$ layer (2).

Figure 5:
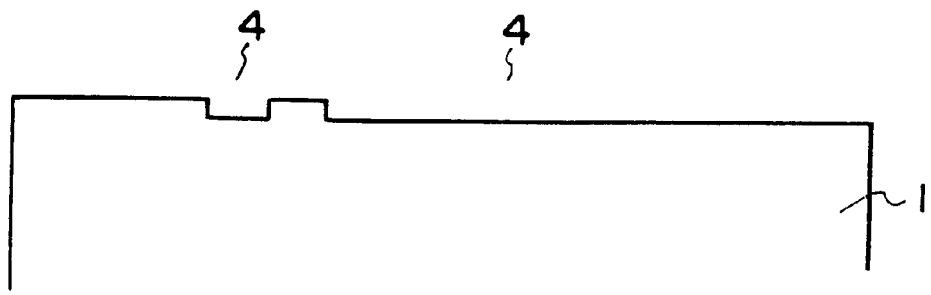
FIG. 5 is a cross section of an Si substrate under progress of a method for aligning optical elements in accordance with the first embodiment of this invention.

Referring to FIG. 5, the Si substrate (1) is contacted with an HF solution to remove the $SiO_2$ layers (3) and (2) from the entire surface of the Si substrate (1) and to produce recess (4) on the areas on which a V-groove for an optical fiber is scheduled to be produced and a metal pad for an optical element are scheduled to be arranged. The dimensional accuracy of the recess (4) can be made ±0.01 μm with respect to the designed dimension.

The foregoing series of processes can be replaced by an ordinary photo lithography process conducted employing a photo resist etching mask rather than an $SiO_2$ etching mask.

Figure 6:
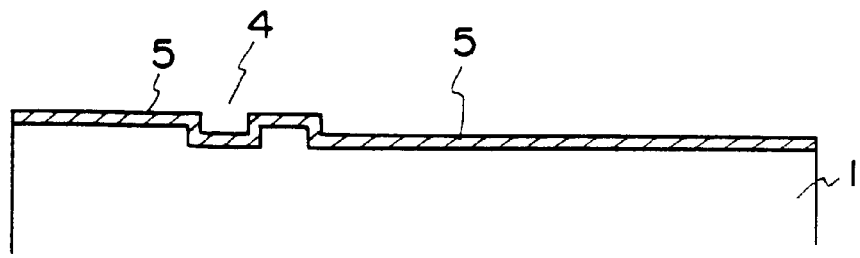
FIG. 6 is a cross section of an Si substrate under progress of a method for aligning optical elements in accordance with the first embodiment of this invention.

Referring to FIG. 6, an oxidation process is applied to the Si substrate (1) to produce an $SiO_2$ layer (5) having an approximate thickness of 6000 Å on the top surface of the Si substrate (1). The thickness of this $SiO_2$ layer (5) is decided, paying attention to a fairly large grade of damage to be caused by an etching process conducted employing a KOH solution.

Figure 7:
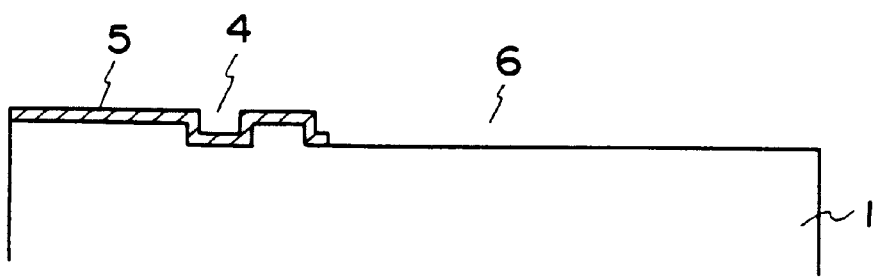
FIG. 7 is a cross section of an Si substrate under progress of a method for aligning optical elements in accordance with the first embodiment of this invention.
Figure 8:
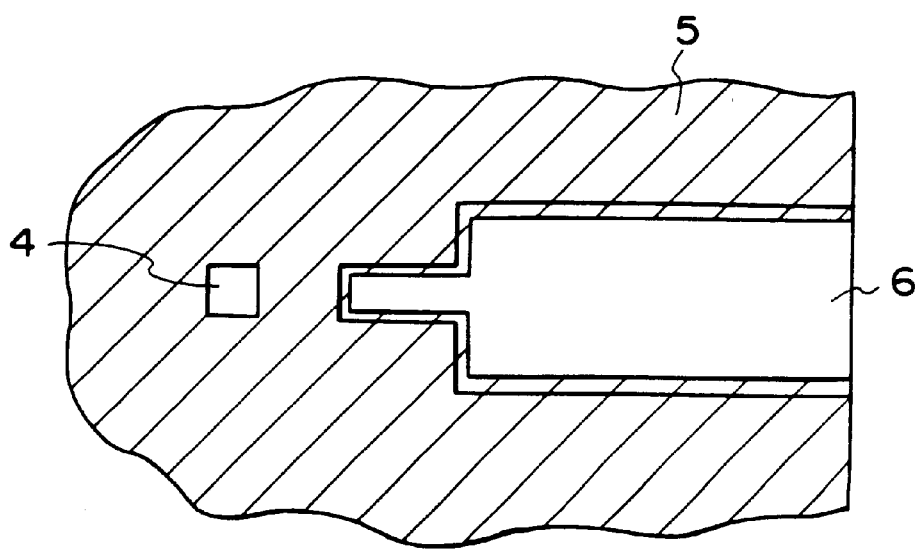
FIG. 8 is a plan view of an Si substrate under progress of a method for aligning optical elements in accordance with the first embodiment of this invention.

Referring to FIGS. 7 and 8, a photo lithography process is conducted for removing the $SiO_2$ layer exclusively from the area in which a V-groove for an optical fiber is scheduled to be arranged, to produce a recess (6) produced in the area in which a V-groove for an optical fiber is scheduled to be arranged. The recess (6) is scheduled to be employed as a reference for an anisotropic etching process to be conducted employing a KOH solution in the next step. A fairly large magnitude of the side etching which accompanies the anisotropic etching process conducted employing a KOH solution must be paid attention, when the mask dimension is decided. As a matter of fact, the dimension of the mask is made 0.7 times as large as the finished dimension of a V-groove.

During the foregoing photo lithography process, the edges of the recess (4) is used as a reference for alignment of a photo mask employable for the foregoing lithography process. Since the $SiO_2$ layer (5) and a photo resist layer (not shown) are transparent, the edges of the recess (4) can be observed therethrough. Therefore, the photo mask employable for exposure of the photo resist layer (not shown) can be readily aligned with the edges of the recess (4) with a high grade of accuracy.

Figure 9:
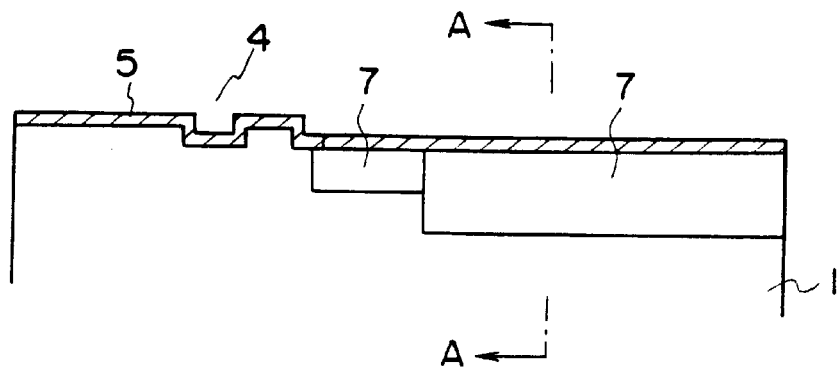
FIG. 9 is is a cross section of an Si substrate under progress of a method for aligning optical elements in accordance with the first embodiment of this invention.
Figure 10:
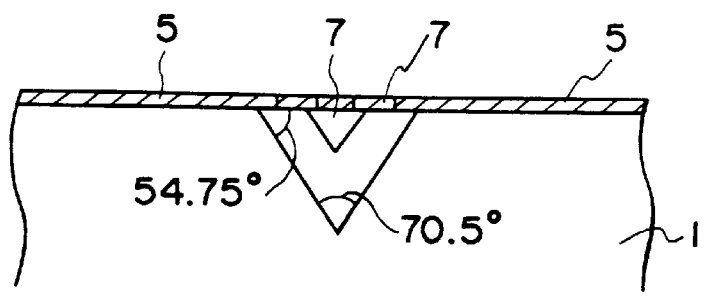
FIG. 10 is a cross section of FIG. 9 taken along the arrow A.

Referring to FIGS. 9 and 10, the Si substrate (1) is contacted with a KOH solution containing 20.5 wt % of KOH in $H_2O$ to produce a V-groove (7) corresponding to the recess (6) produced in the area in which a V-groove for an optical fiber is scheduled to be arranged. Since an etching process conducted employing the KOH solution has characteristics in which a recess having a bottom angle accurately of 70.5° is produced, the cross section of the V-groove (7) becomes as is illustrated in FIG. 10. In other words, the bottom angle and the side angle of the V-groove (7) become respectively 70.5° and 54.75° Since the plan view of the mask (the $SiO_2$ layer (5) having a recess (6) therein) is a rectangle attached by a smaller rectangle, the cross section of the V-groove becomes a duplicate V-groove including a larger one representing the V-groove for receiving the clad portion of an optical fiber and a smaller one representing the V-groove for receiving the core portion of an optical fiber. Due to a result of side etching, the transverse dimension of the V-groove (7) becomes slightly larger than the corresponding dimension of the mask (5). For the convenience sake, FIGS. 9 and 10 alone are drawn in accordance with the regular rule of the projection drawing method. In other words, the SiO$_2$ layer (5) which is seen in the shape of a wall opposite the recess (7) is illustrated as well.

Figure 11:
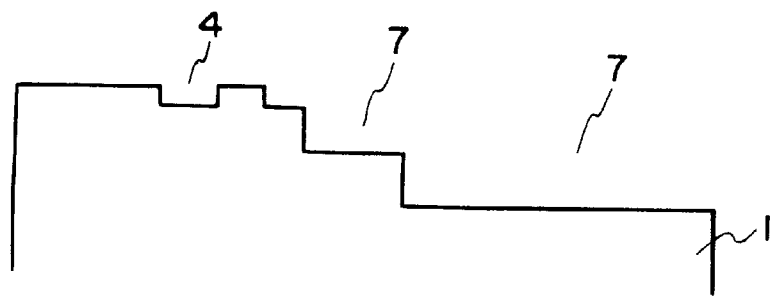
FIG. 11 is a cross section of an Si substrate under progress of a method for aligning optical elements in accordance with the first embodiment of this invention.

Referring to FIG. 11, the Si substrate (1) is contacted with an HF solution to remove the SiO$_2$ layer (5) from the entire top surface of the Si substrate (1). This step is necessary to remove the SiO$_2$ layer (6) which was damaged during the etching process conducted employing a KOH solution.

Figure 12:
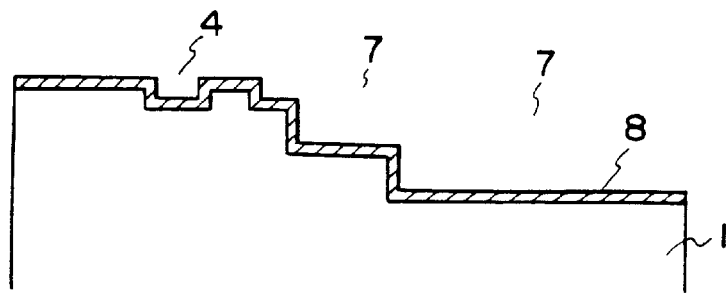
FIG. 12 is a cross section of an Si substrate under progress of a method for aligning optical elements in accordance with the first embodiment of this invention.

Referring to FIG. 12, an oxidation process is conducted to produce a fresh SiO$_2$ layer (8) having an approximate thickness of 6000 Å on the entire surface of the Si substrate (1). This step is necessary to insulate the entire surface of the Si substrate (1).

Figure 13:
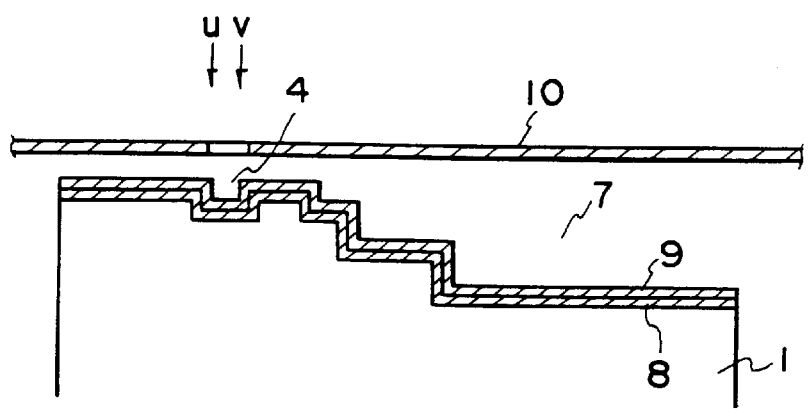
FIG. 13 is a cross section of an Si substrate under progress of a method for aligning optical elements in accordance with the first embodiment of this invention.

Referring to FIG. 13, a photo resist is spin coated on the entire surface of the Si substrate (1) to produce a photo resist layer (9). A photo mask (10) having a transparent area corresponding to the area on which a metal pad for an optical element is scheduled to be arranged is aligned with the edges of the recess (4) produced on the area on which a metal pad for an optical element is scheduled to be arranged. Since the photo resist layer (9) and the SiO$_2$ layer (8) are transparent, the edges of the recess (4) can readily be observed. Thus, an accurate alignment can be realized for the photo mask (10) with the edges of the recess (4). The photo mask (10) is employed to expose a selected area of the photo resist layer (9).

Figure 14:
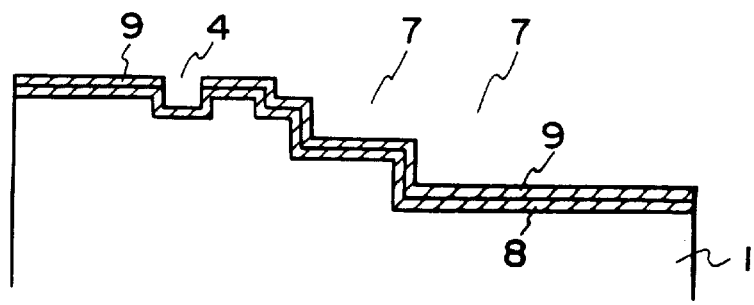
FIG. 14 is a cross section of an Si substrate under progress of a method for aligning optical elements in accordance with the first embodiment of this invention.

Referring to FIG. 14, the photo resist layer (9) is developed to be patterned into the negative shape of the metal pad for an optical element.

Figure 15:
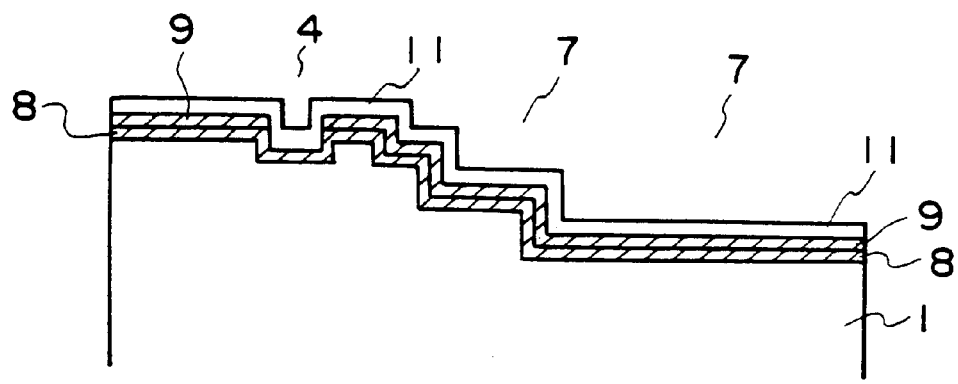
FIG. 15 is a cross section of an Si substrate under progress of a method for aligning optical elements in accordance with the first embodiment of this invention.

Referring to FIG. 15, three independent sputtering processes are conducted in a row to produce a Ti layer, a Pt layer and an Au layer. As a result, a piled layer (11) of Au/Pt/Ti is produced on the photo resist layer (9) patterned in the previous step.

Figure 16:
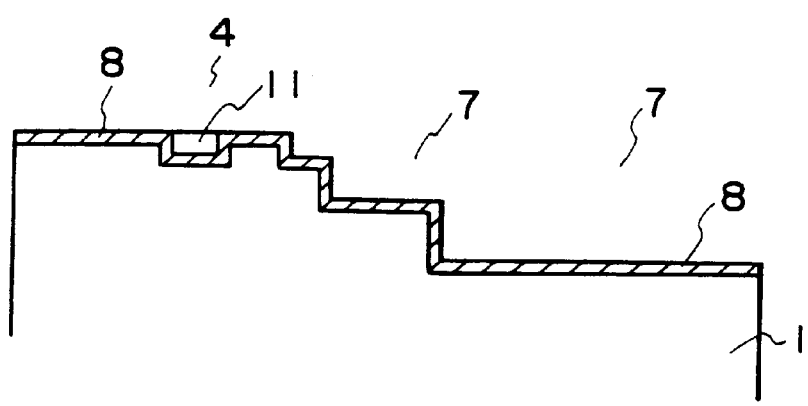
FIG. 16 is a cross section of an Si substrate under progress of a method for aligning optical elements in accordance with the first embodiment of this invention.

Referring to FIG. 16, the photo resist layer (9) is washed away to leave the piled layer (11) of Au/Pt/Ti exclusively on the area on which a metal pad for an optical element is scheduled to be arranged.

Figure 17:
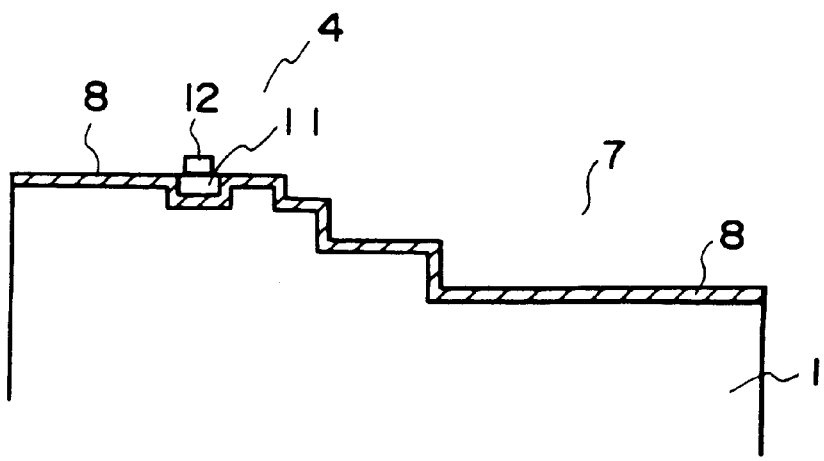
FIG. 17 is a cross section of an Si substrate under progress of a method for aligning optical elements in accordance with the first embodiment of this invention.

Referring to FIG. 17, a lift off process is employed again to produce an Au—Sn layer (12) on a selected area of the piled layer (11) of Au/Pt/Ti produced in the previous step.

Figure 18:
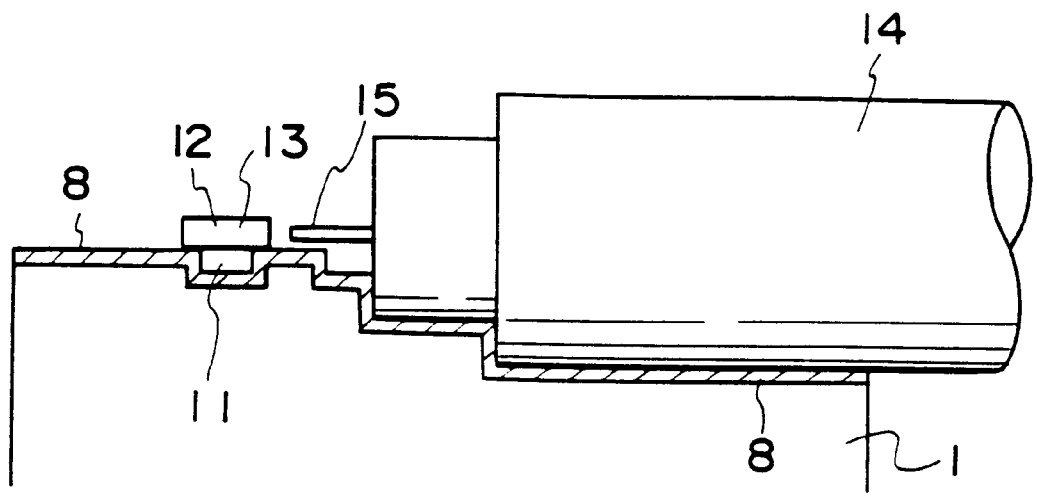
FIG. 18 is a V-groove substrate produced employing a method for aligning optical elements in accordance with the first embodiment of this invention.

Referring to FIG. 18, an optical element (13) such as a Laser diode or a Photo diode, is arranged on the Au—Sn layer (12), before being heated to be adhered to each other. During a process for mounting the optical element (13), the edges of the piled layer (11) of Au/Pt/Ti is employed as the reference for the process for aligning the optical element (13) with the piled layer (11) of Au/Pt/Ti.

Finally, an optical fiber (14) is arranged in the V-groove (7).

Since the V-groove (7) and the piled layer (11) of Au/Pt/Ti are aligned with each other with a high grade of accuracy, the center of the core of the optical fiber (13) can be precisely aligned with the optical axis of the optical element (13).

The foregoing description has clarified that the first embodiment of this invention has successfully provided a method for aligning optical elements, with a high grade of dimensional accuracy.

Second Embodiment

A method for inspecting the linearity of the edges of a V-groove during the process for producing the V-groove.

Figure 19:
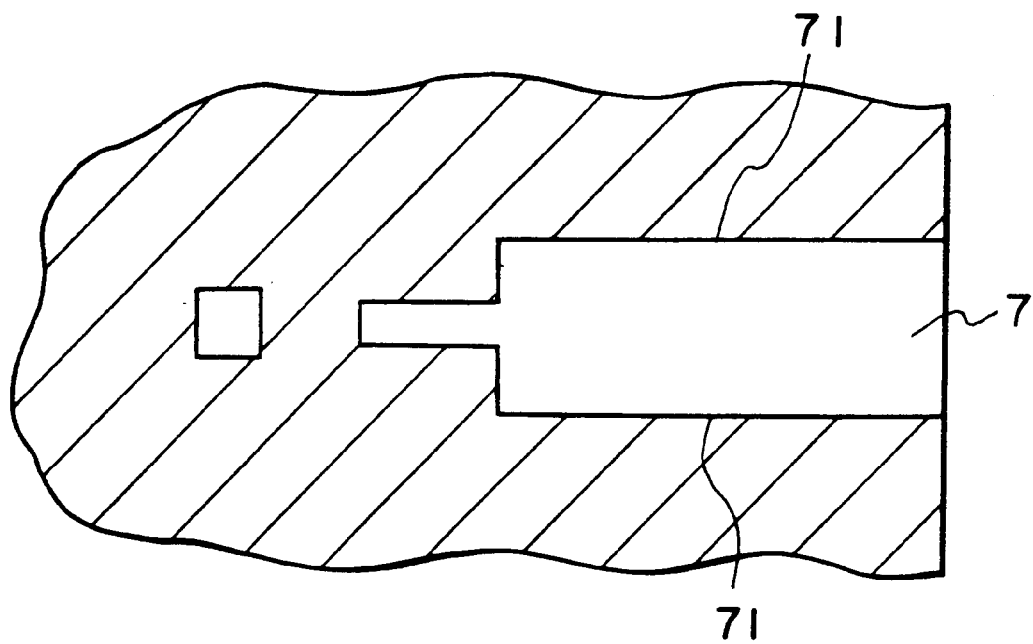
FIG. 19 is a cross section of an Si substrate under progress of a method for inspecting the linearity of the edges of a V-groove during the process for producing the V-groove in accordance with the second embodiment of this invention.

Referring to FIG. 19, a real time inspection is conducted to monitor the linearity of the longitudinal edges (71) of the V-groove (7) by comparing the same with the corresponding edges of the recess (6). Since the etching mask made of the SiO$_2$ layer (5) is transparent, the edges of the recess (6) can readily be observed. As a result, the edges of the recess (6) is allowed to be used as a reference for monitoring the linearity of the edges of a V-groove. As a result, an erroneous substrate can readily be picked up during the etching process for producing a V-groove.

The foregoing description has clarified that the second embodiment of this invention has successfully provided a method for inspecting the linearity of the edges of a V-groove during the process for producing the V-groove, the inspection being conducted during the process for etching the V-groove on the real time basis.

The foregoing description has clarified that this invention has successfully provided a method for aligning optical elements, with a high grade of accuracy and a method for inspecting the linearity of the edges of a V-groove during the process for producing the V-groove, the inspection being conducted during the process for etching the V-groove on the real time basis.

Although this invention has been described with reference to specific embodiments, this description is not meant to be construed in a limiting sense. Various modifications of the disclosed embodiments, as well as other embodiments of this invention, will be apparent to persons skilled in the art upon reference to the description of this invention. It is therefore contemplated that the appended claims will cover any such modifications or embodiments as fall within the true scope of this invention.

What is claimed is:

1. A method of aligning a plurality of optical elements on a substrate, comprising:

producing a plurality of recesses in the substrate which define a desired alignment between the optical elements when the optical elements are mounted to the substrate;

producing a mounting for one of the optical elements on the substrate; and using one of the recesses as an alignment reference during the producing of the mounting, so as to maintain the desired alignment.

2. The method according to claim 1, wherein said producing the mounting includes forming a V-groove for receiving an optical fiber.

3. The method according to claim 1, wherein the mounting includes a metal pad for a light emitting or a light receiving element.

4. The method according to claim 1, wherein said producing the mounting includes coating the substrate with a photoresist layer.

5. The method according to claim 4, further comprising exposing the photoresist layer through a photo mask.

6. The method according to claim 5, wherein said exposing includes using an edge of one of the recesses as an alignment mark for the photo mask.

7. A method of orienting an optical element on a substrate, comprising:

producing a recess in the substrate to define the desired orientation of the optical element when the optical element is mounted on the substrate;

producing a mounting for the optical element on the substrate; and using the recess as an alignment reference during said producing of the mounting, so as to maintain the desired orientation.

* * * * *